(12) United States Patent
Eudy et al.

(10) Patent No.: US 11,557,234 B1
(45) Date of Patent: Jan. 17, 2023

(54) WINDSHIELD ZONE DIMMING AND AUGMENTED REALITY HEAD UP DISPLAY

(71) Applicant: GM Global Technology Operations LLC, Detroit, MI (US)

(72) Inventors: Madalyn Theresa Eudy, Plymouth, MI (US); Joseph F. Szczerba, Grand Blanc, MI (US); John P. Weiss, Shelby Township, MI (US); Thomas A. Seder, Fraser, MI (US); Kai-Han Chang, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/866,411

(22) Filed: Jul. 15, 2022

(51) Int. Cl.
| | |
|---|---|
| *B60J 3/04* | (2006.01) |
| *G02F 1/163* | (2006.01) |
| *B60K 37/02* | (2006.01) |
| *G02B 27/01* | (2006.01) |
| *G09G 3/00* | (2006.01) |
| *G06F 3/01* | (2006.01) |
| *B60K 35/00* | (2006.01) |

(52) U.S. Cl.
CPC ............. *G09G 3/001* (2013.01); *B60J 3/04* (2013.01); *B60K 35/00* (2013.01); *G02B 27/0101* (2013.01); *G06F 3/013* (2013.01); *B60K 2370/1529* (2019.05); *G02B 2027/014* (2013.01); *G02B 2027/0141* (2013.01); *G09G 2320/0626* (2013.01); *G09G 2340/0464* (2013.01); *G09G 2354/00* (2013.01); *G09G 2360/144* (2013.01); *G09G 2380/10* (2013.01)

(58) Field of Classification Search
CPC ...................................................... B60R 1/00
See application file for complete search history.

(56) References Cited

U.S. PATENT DOCUMENTS

| | | | |
|---|---|---|---|
| 9,994,091 B2 | 6/2018 | Kaphengst et al. | |
| 2014/0320946 A1* | 10/2014 | Tomkins | B60J 3/04 359/275 |
| 2018/0024359 A1* | 1/2018 | Yoneyama | H04N 9/3194 345/9 |

* cited by examiner

*Primary Examiner* — Nan-Ying Yang
(74) *Attorney, Agent, or Firm* — Vivacqua Crane PLLC (57) ABSTRACT

A method includes detecting at least one remote vehicle that is within a predetermined distance from the host vehicle, detecting that the light of the remote vehicle that is on, determining a luminous intensity of a light beam emitted by the light of at least one remote vehicle that is within the predetermined distance from the host vehicle, comparing the luminous intensity of the light beam emitted by the light of at least one remote vehicle to a predetermined threshold to determine whether the luminous intensity of the light beam emitted by the light is greater than the predetermined threshold in response to determining the luminous intensity of the light of at least one remote vehicle that is within the predetermined distance from the host vehicle, and dimming at least a portion of the windshield of the host vehicle.

20 Claims, 6 Drawing Sheets

FIG. 9

WINDSHIELD ZONE DIMMING AND AUGMENTED REALITY HEAD UP DISPLAY

INTRODUCTION

The present disclosure relates to a system and method for windshield zone dimming.

This introduction generally presents the context of the disclosure. Work of the presently named inventors, to the extent it is described in this introduction, as well as aspects of the description that may not otherwise qualify as prior art at the time of filing, are neither expressly nor impliedly admitted as prior art against this disclosure.

At night, the light emitted by the lights of oncoming vehicles may cause excessive glare. For a vehicle operator, driving while subjected to excessive glare may be challenging. It is therefore desirable to develop a system and a method that can minimize the effects of excessive glare while driving.

SUMMARY

The presently disclosed system includes a display, such as an augmented reality HUD display, and a transparent windshield with a smart glass having electrically-tunable transmittance capabilities. When bright lights of a remote vehicles are identified within the road scene, such as headlights from oncoming vehicles, appropriate locations of the windshield are dimmed to shade the driver's eyes from excessive glare. The display simultaneously highlights the remote vehicle to maintain the driver's awareness of the remote vehicle presence and real-time location.

The present disclosure describes a method for dimming a windshield of a host vehicle. In an aspect of the present disclosure, the method includes detecting at least one remote vehicle that is within a predetermined distance from the host vehicle, detecting that the light of the remote vehicle is on, determining a luminous intensity of a light beam emitted by the light of the remote vehicle in response to detecting the remote vehicle is within the predetermined distance from the host vehicle and detecting that the light of the remote vehicle is on, comparing the luminous intensity of the light beam emitted by the light of the remote vehicle to a predetermined threshold to determine whether the luminous intensity of the light beam emitted by the light is greater than the predetermined threshold in response to determining the luminous intensity of the light of the remote vehicle that is within the predetermined distance from the host vehicle, and dimming at least a portion of the windshield of the host vehicle to minimize a glare caused by the light beam emitted by the light of the remote vehicle that is within the predetermined distance from the host vehicle in response to determining that the luminous intensity of the light beam emitted by the light is greater than the predetermined threshold.

In an aspect of the present disclosure, the method further includes determining a location of eyes of a vehicle operator of the host vehicle.

In an aspect of the present disclosure, the method further includes determining a location of the remote vehicle that is within the predetermined distance from the host vehicle.

In an aspect of the present disclosure, the method further includes generating a virtual image that identifies the remote vehicle.

In an aspect of the present disclosure, the method further includes determining, in real time, the location of the virtual image using the location of the eyes of the vehicle operator and the location of the remote vehicle that is within the predetermined distance from the host vehicle.

In an aspect of the present disclosure, the virtual image includes a bounding box surrounding the remote vehicle that is within the predetermined distance from the host vehicle.

In an aspect of the present disclosure, the windshield includes a smart glass. The smart glass includes a plurality of segments. Each of the plurality of segments is individually configured to transition between an opaque state and a transparent state independently of the other segments. The method further includes determining which of the segments of the smart glass have to be dimmed to cover the light beam of the light of the remote vehicle relative to the location of the eyes of the vehicle operator.

In an aspect of the present disclosure, the method further includes dimming the segments of the smart glass that have to be dimmed to cover the light beam of the light of the remote vehicle relative to the location of the eyes of the vehicle operator.

In an aspect of the present disclosure, the method further includes determining whether the light of the remote vehicle is still on.

In an aspect of the present disclosure, the method further includes stopping dimming at least the portion of the windshield in response to determining that the light of the remote vehicle is not on.

The present disclosure also describes a host vehicle. In an aspect of the present disclosure, the host vehicle includes a windshield including a smart glass, a display configured to project a virtual image on the windshield, a plurality of sensors, and a controller in communication with the plurality of sensors, the smart glass of the windshield, and the display. The controller is programmed to execute the method described above.

Further areas of applicability of the present disclosure will become apparent from the detailed description provided below. It should be understood that the detailed description and specific examples are intended for purposes of illustration only and are not intended to limit the scope of the disclosure.

The above features and advantages, and other features and advantages, of the presently disclosed system and method are readily apparent from the detailed description, including the claims, and exemplary embodiments when taken in connection with the accompanying drawings.

BRIEF DESCRIPTION OF THE DRAWINGS

The present disclosure will become more fully understood from the detailed description and the accompanying drawings, wherein.

DETAILED DESCRIPTION

Reference will now be made in detail to several examples of the disclosure that are illustrated in accompanying drawings. Whenever possible, the same or similar reference numerals are used in the drawings and the description to refer to the same or like parts or steps.

Figure 1:
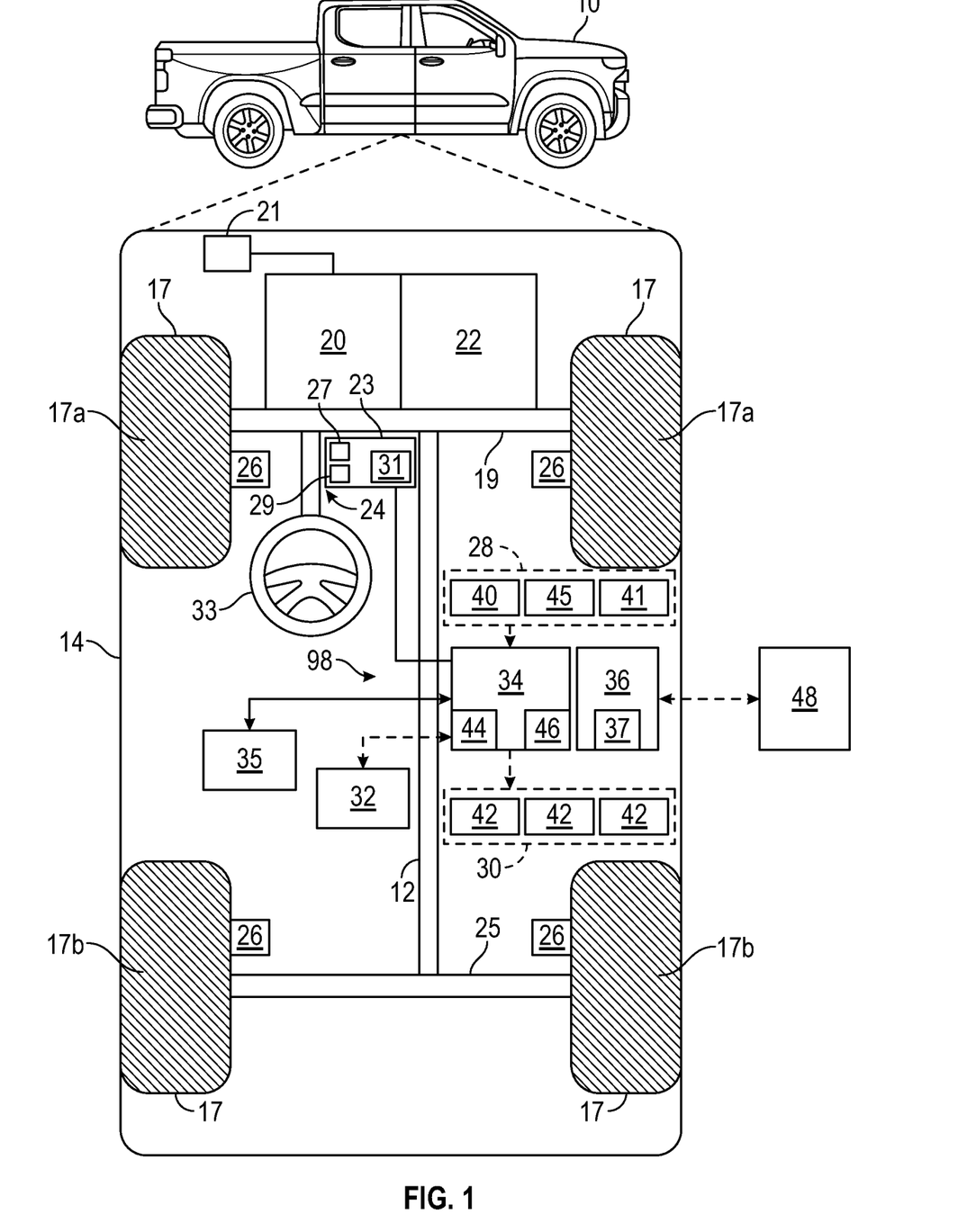
FIG. 1 is a block diagram depicting an embodiment of a vehicle including a system for low visibility driving.

With reference to FIG. 1, a host vehicle 10 generally includes a chassis 12, a body 14, front and rear wheels 17 and may be referred to as a vehicle system. In the depicted embodiment, the host vehicle 10 includes two front wheels 17a and two rear wheels 17b. The body 14 is arranged on the chassis 12 and substantially encloses components of the host vehicle 10. The body 14 and the chassis 12 may jointly form a frame. The wheels 17 are each rotationally coupled to the chassis 12 near a respective corner of the body 14. The host vehicle 10 includes a front axle 19 coupled to the front wheels 17a and a rear axle 25 coupled to the rear wheels 17b.

In various embodiments, the host vehicle 10 may be an autonomous vehicle, and a control system 98 is incorporated into the host vehicle 10. The control system 98 may be referred to as the system or the system for windshield zone dimming using one or more displays 29, such as a multifocal plane augmented reality display. The host vehicle 10 is, for example, a vehicle that is automatically controlled to carry passengers from one location to another. The host vehicle 10 is depicted in the illustrated embodiment as a pickup truck, but it should be appreciated that other vehicles including, trucks, sedans, coupes, sport utility vehicles (SUVs), recreational vehicles (RVs), etc., may also be used. In an embodiment, the host vehicle 10 may be a so-called a Level Two, a Level Three, Level Four, or Level Five automation system. A Level Four system indicates "high automation," referring to the driving mode-specific performance by an automated driving system of aspects of the dynamic driving task, even if a human driver does not respond appropriately to a request to intervene. A Level Five system indicates "full automation," referring to the full-time performance by an automated driving system of aspects of the dynamic driving task under a number of roadway and environmental conditions that can be managed by a human driver. In Level 3 vehicles, the vehicle systems perform the entire dynamic driving task (DDT) within the area that it is designed to do so. The vehicle operator is only expected to be responsible for the DDT-fallback when the host vehicle 10 essentially "asks" the driver to take over if something goes wrong or the vehicle is about to leave the zone where it is able to operate. In Level 2 vehicles, systems provide steering, brake/acceleration support, lane centering, and adaptive cruise control. However, even if these systems are activated, the vehicle operator at the wheel must be driving and constantly supervising the automated features.

As shown, the host vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an electric machine such as a traction motor and/or a fuel cell propulsion system. The host vehicle 10 may further include a battery (or battery pack) 21 electrically connected to the propulsion system 20. Accordingly, the battery 21 is configured to store electrical energy and to provide electrical energy to the propulsion system 20. In certain embodiments, the propulsion system 20 may include an internal combustion engine. The transmission system 22 is configured to transmit power from the propulsion system 20 to the vehicle wheels 17 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 17. The brake system 26 may, in various embodiments, include friction brakes, brake by wire, a regenerative braking system such as an electric machine, and/or other appropriate braking systems. The steering system 24 influences a position of the vehicle wheels 17 and may include a steering wheel 33. While depicted as including a steering wheel 33 for illustrative purposes, in some embodiments contemplated within the scope of the present disclosure, the steering system 24 may not include a steering wheel 33.

The sensor system 28 includes one or more sensors 40 (i.e., sensing devices) that sense observable conditions of the exterior environment and/or the interior environment of the host vehicle 10. The sensors 40 are in communication with the controller 34 and may include, but are not limited to, one or more radars, one or more light detection and ranging (lidar) sensors, one or more proximity sensors, one or more odometers, one or more ground penetrating radar (GPR) sensors, one or more steering angle sensors, Global Navigation Satellite System (GNSS) transceivers (e.g., one or more global positioning systems (GPS) transceivers), one or more tire pressure sensors, one or more cameras 41, one or more gyroscopes, one or more accelerometers, one or more inclinometers, one or more speed sensors, one or more ultrasonic sensors, one or more inertial measurement units (IMUs), one or more night-vision devices, thermal imaging sensors, one or more light sensors 45, and/or other sensors. Each sensor 40 is configured to generate a signal that is indicative of the sensed observable conditions of the exterior environment and/or the interior environment of the host vehicle 10. Because the sensor system 28 provides data to the controller 34, the sensor system 28 and its sensors 40 are considered sources of information (or simply sources).

The light sensor 45 is a photoelectric instrument that converts light energy or photons into an electrical (electrons) signal and thereby measure a luminous intensity of a light beam. The light sensor generates an electrical output signal having an energy corresponding to the input light energy. As non-limiting examples, the light sensors 45 may be photo-diodes, photo-resistors, and/or photo-transistors. It is envisioned that the cameras 41 may also measure a luminous intensity of a light beam.

The actuator system 30 includes one or more actuator devices 42 that control one or more vehicle features such as, but not limited to, the propulsion system 20, the transmission system 22, the steering system 24, and the brake system 26. In various embodiments, the vehicle features may further include interior and/or exterior vehicle features such as, but are not limited to, doors, a trunk, and cabin features such as air, music, lighting, etc.

The data storage device 32 stores data for use in automatically controlling the host vehicle 10. In various embodiments, the data storage device 32 stores defined maps of the navigable environment. In various embodiments, the defined maps may be predefined by and obtained from a remote system. For example, the defined maps may be assembled by the remote system and communicated to the host vehicle 10 (wirelessly and/or in a wired manner) and stored in the data storage device 32. The data storage device 32 may be part of the controller 34, separate from the controller 34, or part of the controller 34 and part of a separate system.

The host vehicle 10 may further include one or more airbags 35 in communication with the controller 34 or another controller of the host vehicle 10. The airbag 35 includes an inflatable bladder and is configured to transition between a stowed configuration and a deployed configuration to cushion the effects of an external force applied to the host vehicle 10. The sensors 40 may include an airbag sensor, such as an IMU, configured to detect an external force and generate a signal indicative of the magnitude of such external force. The controller 34 is configured to command the airbag 35 to deploy based on the signal from one or more sensors 40, such as the airbag sensor. Accordingly, the controller 34 is configured to determine when the airbag 35 has been deployed.

The controller 34 includes at least one processor 44 and a non-transitory computer readable storage device or media 46. The processor 44 may be a custom made or commercially available processor, a central processing unit (CPU), a graphics processing unit (GPU), an auxiliary processor among several processors associated with the controller 34, a semiconductor-based microprocessor (in the form of a microchip or chip set), a macroprocessor, a combination thereof, or generally a device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 34 in controlling the host vehicle 10. The controller 34 of the host vehicle 10 may be referred to as a vehicle controller and may be programmed to execute a method 100 (FIG. 16) as described in detail below.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the host vehicle 10, and generate control signals to the actuator system 30 to automatically control the components of the host vehicle 10 based on the logic, calculations, methods, and/or algorithms. Although a single controller 34 is shown in FIG. 1, embodiments of the host vehicle 10 may include a plurality of controllers 34 that communicate over a suitable communication medium or a combination of communication mediums and that cooperate to process the sensor signals, perform logic, calculations, methods, and/or algorithms, and generate control signals to automatically control features of the host vehicle 10. In various embodiments, one or more instructions of the controller 34 are embodied in the control system 98.

The host vehicle 10 includes a user interface 23, which may be a touchscreen in the dashboard. The user interface 23 may include, but is not limited to, an alarm, such as one or more speakers 27 to provide an audible sound, haptic feedback in a vehicle seat or other object, one or more displays 29, one or more microphones 31 and/or other devices suitable to provide a notification to the vehicle user of the host vehicle 10. The user interface 23 is in electronic communication with the controller 34 and is configured to receive inputs by a user (e.g., a vehicle operator or a vehicle passenger). For example, the user interface 23 may include a touch screen and/or buttons configured to receive inputs from a vehicle user 11 (e.g., vehicle operator). Accordingly, the controller 34 is configured to receive inputs from the user via the user interface 23.

The host vehicle 10 may include one or more displays 29 configured to display information to the vehicle user 11 (e.g., vehicle operator or passenger) and may be an augmented reality (AR) display or a hybrid AR display. In the present disclosure, the term "AR display" means a display that presents information to users, while still allowing sight of the outside world. In certain embodiments, the display 29 may be configured as a head-up display (HUD), and/or a full windshield display. Accordingly, the display 29 may be an AR HUD or a full windshield display. In an AR HUD, images are projected on a windshield 39 of the host vehicle 10. As discussed below, the display 29 may be a multi-focal plane AR display to facilitate manipulation (e.g., size, location, and type) of the virtual images 50.

The communication system 36 is in communication with the controller 34 and is configured to wirelessly communicate information to and from other remote vehicles 48, such as but not limited to, other vehicles ("V2V" communication), infrastructure ("V2I" communication), remote systems at a remote call center (e.g., ON-STAR by GENERAL MOTORS) and/or personal electronic devices, such as a mobile phone. In the present disclosure, the term "remote vehicle" means a vehicle, such as a car, configured to transmit one or more signals to the host vehicle 10 while not physically connected to the host vehicle 10. In certain embodiments, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards. Accordingly, the communication system 36 may include one or more antennas and/or communication transceivers 37 for receiving and/or transmitting signals, such as cooperative sensing messages (CSMs). The communication transceivers 37 may be considered sensors 40. The communication system 36 is configured to wirelessly communicate information between the host vehicle 10 and another vehicle. Further, the communication system 36 is configured to wirelessly communicate information between the host vehicle 10 and infrastructure or other vehicles.

Figure 2:
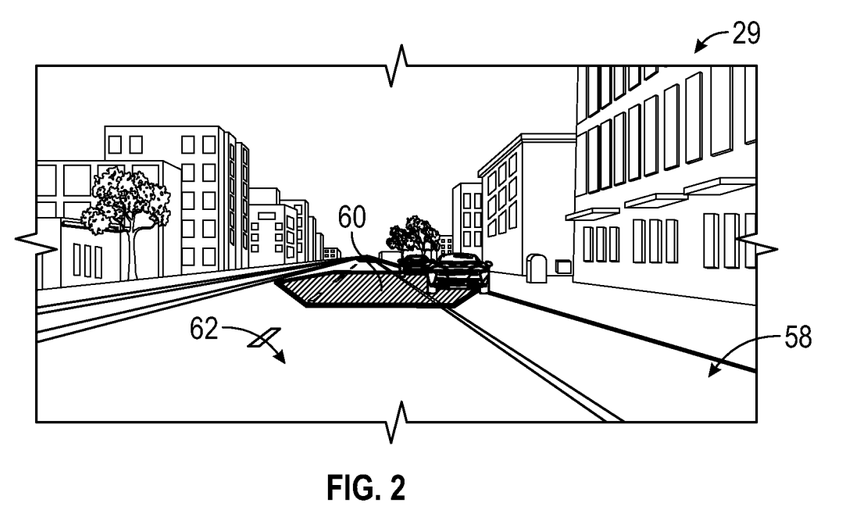
FIG. 2 is a schematic front view of the multi-focal plane augmented reality display of the vehicle of FIG. 1, highlighting a second image plane of the multi-focal plane augmented reality display of the vehicle of FIG. 1.
Figure 3:
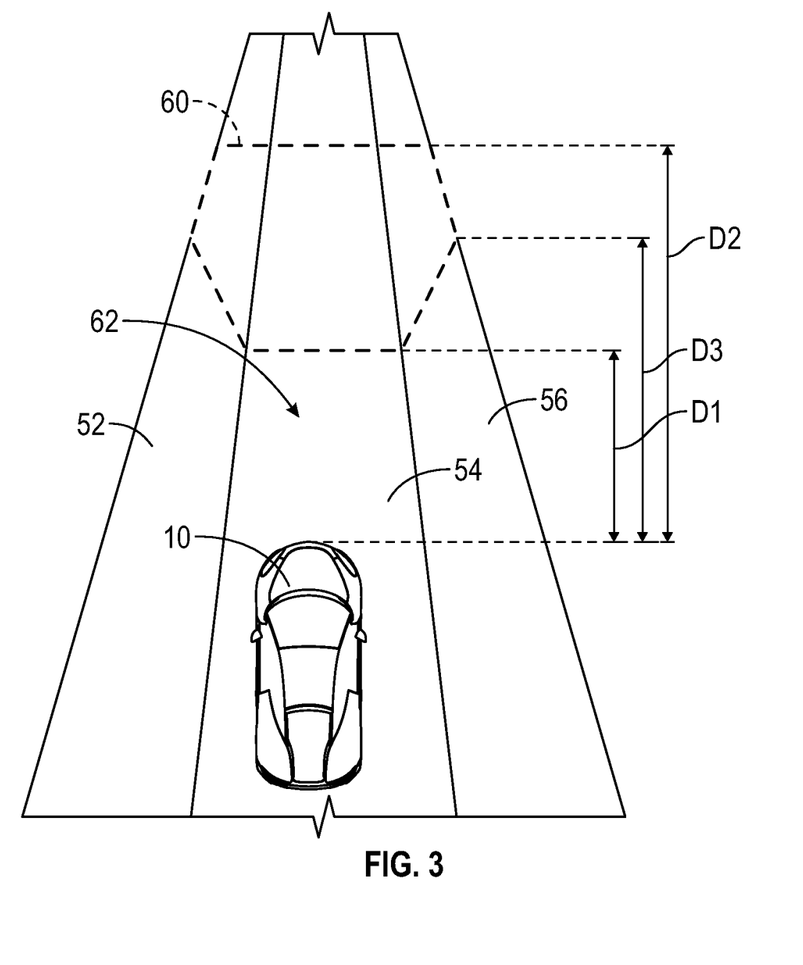
FIG. 3 is a schematic diagram of the second image plane of the multi-focal plane augmented reality display of FIG. 1.
Figure 7:
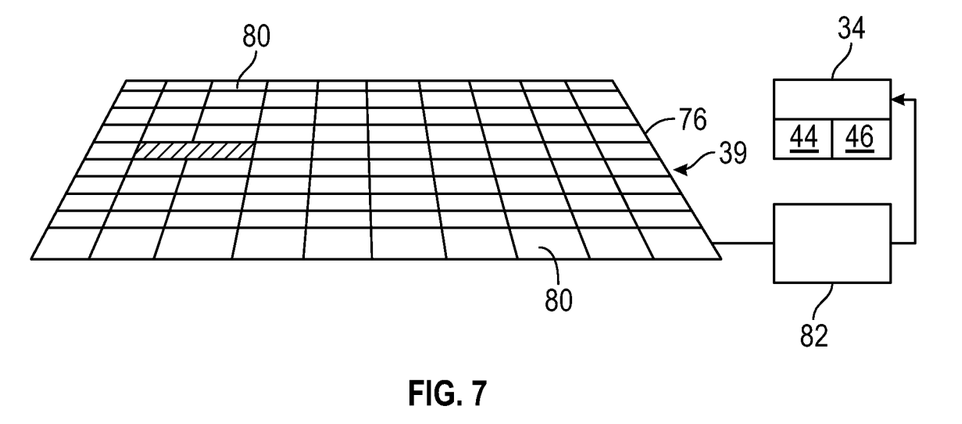
FIG. 7 is a schematic perspective view of a smart glass of the windshield of the vehicle of FIG. 1.
Figure 8:
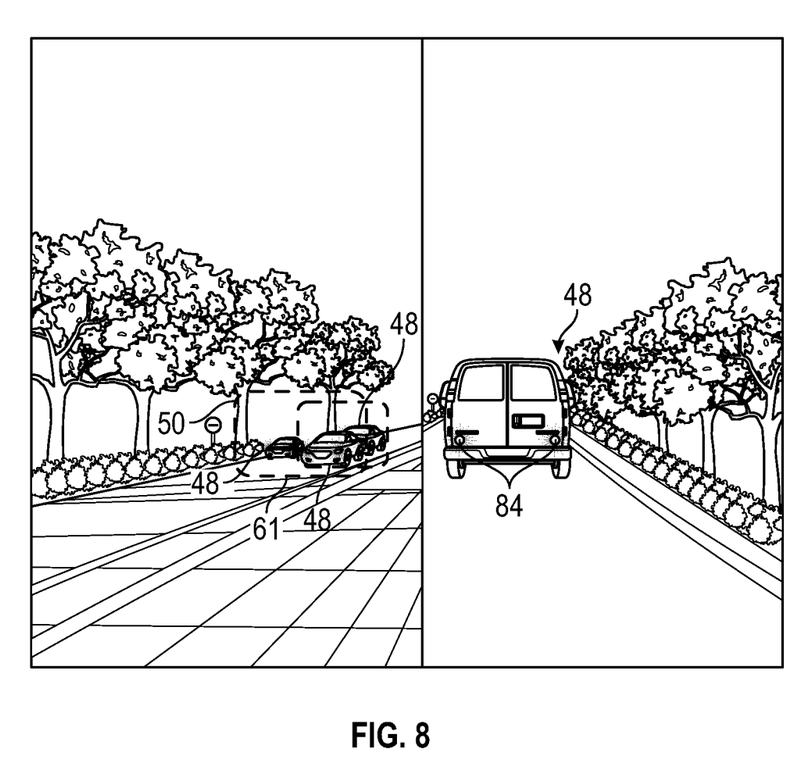
FIG. 8 is a schematic front view through the windshield of the vehicle of FIG. 1.

With reference to FIGS. 2 and 3, the display 29 may be a multi-focal plane AR display as mentioned above. In this case, the display 29 has a first image plane 58 and a second image plane 60. The first image plane 58 shows the view of the outside world, and the second image plane 60 is reserved for displaying the virtual images 50 (FIG. 7). The second image plane 60 spans multiple lanes and the virtual images 50 appear at a location farther on the roadway surface 62 relative to the first image plane 58. For instance, as shown in FIG. 14, the second image plane 60 covers the left lane 52, the central lane 54, and the right lane 56. As a non-limiting example, in the central lane 54, the second image plane 60 starts at a first predetermined distance D1 (e.g., twenty-five meters) from the host vehicle 10 and ends at a second predetermined distance D2 (e.g., ninety meters) from the host vehicle 10. Regardless of the specific distances, the second predetermined distance D2 is greater than the first predetermined distance D1 to help the vehicle user 11 see the virtual images 50 (FIG. 8). In the left lane 52 and the right lane 56, the second image plane 60 is delimited by a sloped boundary that starts at the first predetermined distance D1 from the host vehicle 10 and ends at a third predetermined distance D3 (e.g., fifty meters) from the host vehicle 10. The third predetermined distance D3 is greater than the first predetermined distance D1 and less than the second predetermined distance D2 to help the vehicle user 11 (FIG. 6) see the virtual images 50 (FIG. 7). As used herein, the term "multi-focal plane AR display" means an AR display that presents images in more than one image plane, wherein the image planes are at different locations. It is desirable to use a multi-focal plane AR display in the presently disclosed system 98 to easily change the size, type, and/or location of the virtual images 50 with respect to the view of the outside world.

Figure 4:
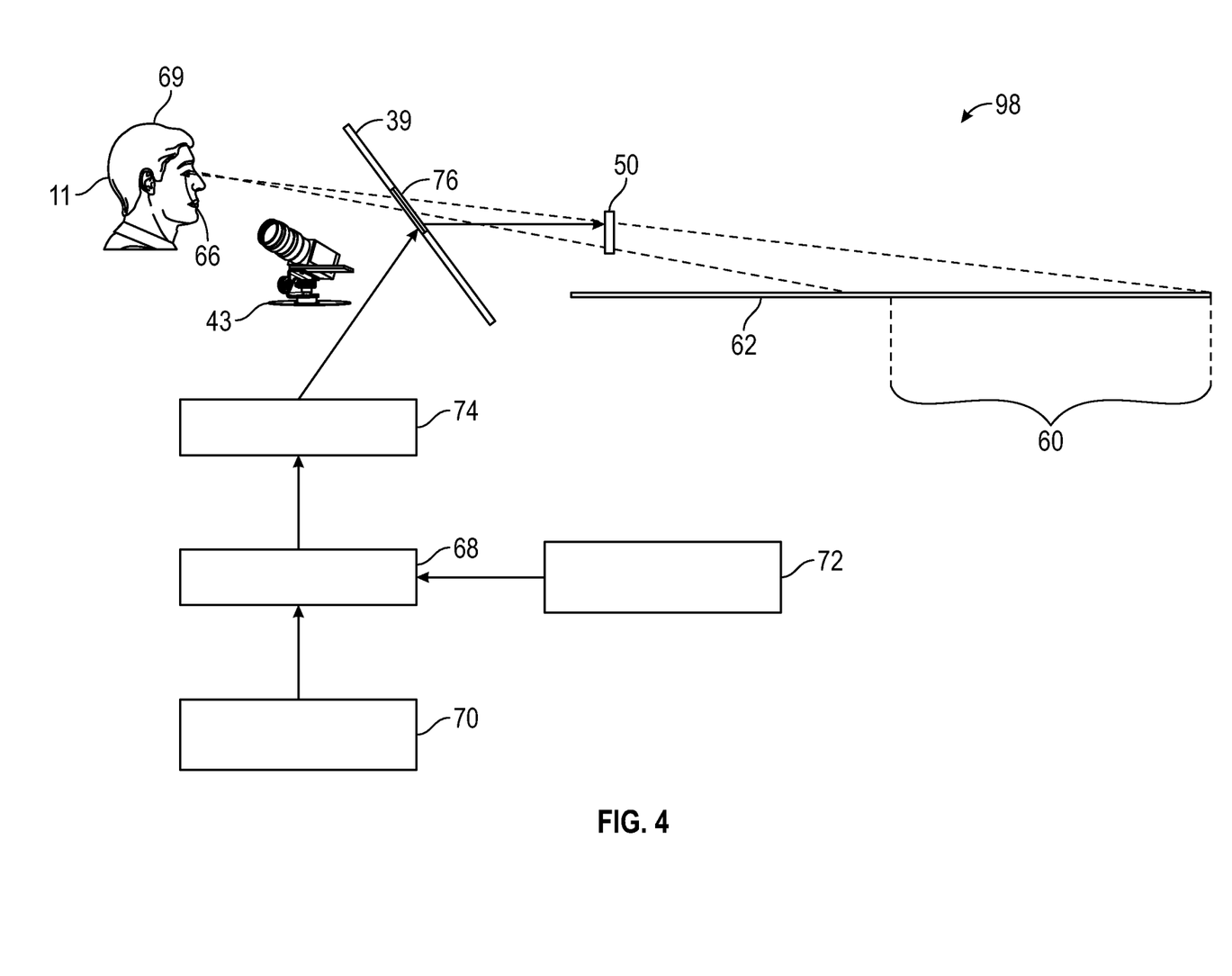
FIG. 4 is a schematic diagram of part of the system for displaying information on the multi-focal plane augmented reality display of the vehicle of FIG. 1.

With reference to FIG. 4, the system 98 includes a user tracker 43 (e.g., eye tracker and/or head tracker) configured to track the position and movement of the eyes 66 and/or the head 69 of the vehicle user 11. In the depicted embodiment, the user tracker 43 may be configured as one or more of cameras 41 of the host vehicle 10. As discussed above, the cameras 41 are considered sensors 40 of the host vehicle 10. As a sensor 40, the user tracker 43 is in communication with the controller 34, which includes a system manager 68. During operation of the system 98, the system manager 68 receives at least a first input 70 and a second input 72. The first input 70 is indicative of the position of the vehicle in space (i.e., the vehicle location in space), and the second input 72 is indicative of the vehicle user position in the host vehicle 10 (e.g., the position of the eyes 66 and/or the head 69 of the vehicle user 11 in the host vehicle 10). The first input 70 may include data such as GNSS data (e.g., GPS data), vehicle speed roadway curvature, and vehicle steering, and this data may be collected from the sensors 40 of the host vehicle 10 and/or other remote vehicles 48 through the communication system 36 of the host vehicle 10. The second input 72 may be received from the user tracker (e.g., eye tracker and/or head tracker). The system manager 68 is configured to determine (e.g., compute) the type, size, shape, and color of the conformal graphics (i.e., virtual images 50) based on the first input 70 (i.e., the vehicle location in space), the second input 72 (e.g., the position of the eyes and/or head of the user in the host vehicle 10), and the sensed vehicle driving environment (which may be obtained through the sensors 40). The type, size, shape, and color of the conformal graphics of the virtual image 50 may be collectively referred to as the virtual image characteristics.

With continued reference to FIG. 4, the system 98 further includes an image engine 74, which is part of the display 29, and may be an integrated circuit configured to generate the virtual images 50. These generated virtual images 50 are then projected on the windshield 39 (if the display 29 is a HUD) to show the virtual images 50 on the second image plane 60 along the roadway surface 62.

Figure 5:
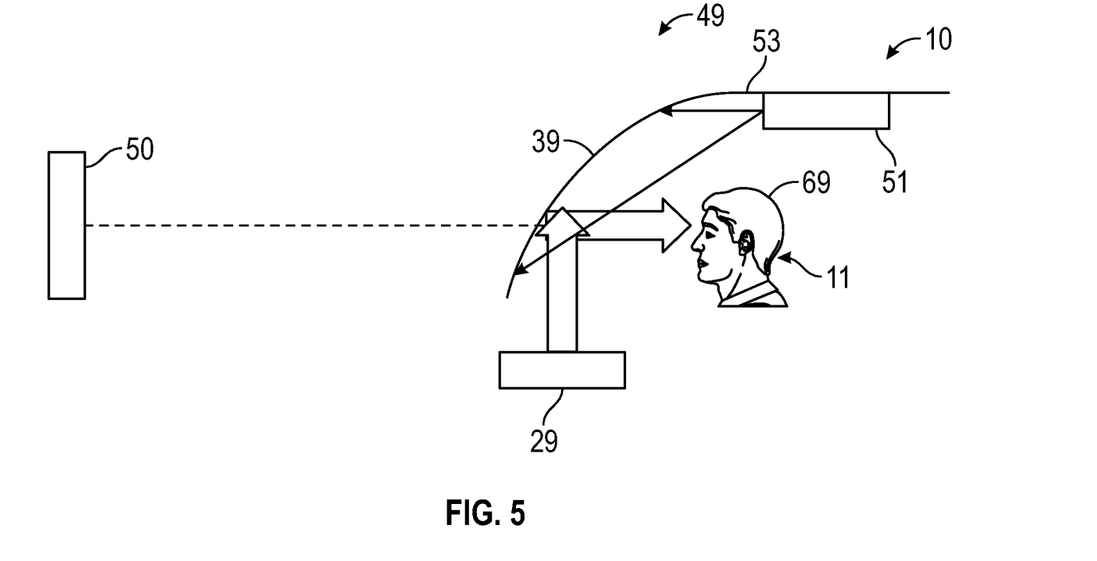
FIG. 5 is a schematic diagram of a hybrid augmented reality display system of the vehicle of FIG. 1.
Figure 6:
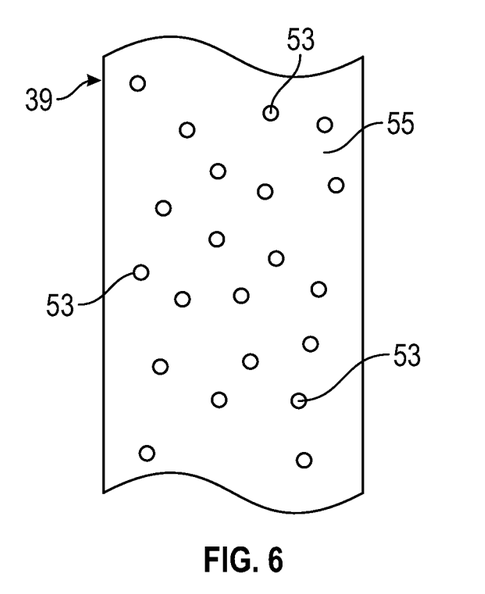
FIG. 6 is a schematic side view of the windshield of the hybrid augmented reality display system of FIG. 5.

With reference to FIGS. 5 and 6, the display 29 may be part of a hybrid AR HUD system 49. In the hybrid AR HUD system 49, the display 29 is configured as an AR HUD and projects images on the windshield 39 of the host vehicle 10. As discussed below, the display 29 may be a multi-focal plane AR display to facilitate manipulation (e.g., size, location, and type) of the virtual images 50. In addition to the AR HUD, the hybrid AR HUD system 49 includes RGB phosphors 53 embedded in the windshield 39. The windshield 39 may be wholly or partly made of polyvinyl butyral, and the RGB phosphors 53 may be embedded in random places in the windshield 39. Accordingly, the windshield 39 may include a polyvinyl butyral layer 55 and RGB phosphors 53 embedded in the polyvinyl butyral layer 55. The hybrid AR HUD system 49 may further include a projector 51, such as a Pico projector, attached to the headliner of the host vehicle 10. The projector 51 is configured to emit a violet or ultraviolet laser to excite RGB phosphors 53 embedded in the polyvinyl butyral layer 55 of the windshield 39. Therefore, the lasers projected from the projector 51 are specifically designed to excite the RGB phosphors 53 embedded in the polyvinyl butyral layer 55 of the windshield 39. As a result, a laser induced fluorescence will occur for every irradiated spot of the windshield 39. The projector 51 may have a wide throw angle. Photons are born at the phosphor location, and, for this reason, the image distance is at the windshield plane. The images generated by the AR HUD display 29 and the excited RGB phosphors may overlap.

Referring again to FIG. 4, the windshield 39 may be or include a smart glass 76 to allow parts or the entirety of the windshield 39 to be opaque or transparent upon application of a voltage to the smart glass 76. As non-limiting examples, the smart glass 76 may be a polymer dispersed liquid crystal (PDLC) film, a polymer stabilized liquid crystal (PSLC) film, a guest host liquid crystal layer, and/or one or more electrochromic materials to allow parts or the entirety of the windshield 39 to be opaque or transparent upon application of a voltage to the smart glass 76. The PDLC film entails a dispersion of liquid crystal (LC) droplets in a polymer matrix. Further, while normally opaque, the PDLC film has the ability to "clear up" under the influence of an electric field, becoming transparent. In the PSLC film, a polymer forms a sponge-like structure in a continuous liquid crystal (LC) medium, and the concentration of LC is much higher than the polymer concentration. The guest host liquid crystal layers are similar to more common liquid crystal films, but also include polymers, inorganic particles, or dichroic dye within the liquid crystal matrix. Electrochromic materials affect the optical color or opacity of a surface when a voltage is applied. Regardless of the specific materials used to achieve the smart glass 76, the smart glass 76 allows the parts or the entire windshield 39 to transition between an opaque state and a transparent state. While the smart glass 76 is shown in FIG. 4, the smart glass 76 may also be part of the windshield shown in FIG. 5.

With reference to FIG. 7, the smart glass 76 is divided into segments 80 in the windshield 39. Accordingly, the smart glass 76 may cover part or the entire surface area of the windshield 39 in order to dim parts or the entire windshield 39. Each segment 80 is configured to transition between an opaque state and a transparent state. In the opaque state, visible light cannot pass through the segment 80. In the transparent state, visible light can pass through the segment 80. A power supply 82 is electrically connected to each individual segment 80. Variable power is applied to each individual segment 80 to dim the relevant segment 80 at different dimming levels. The controller 34 is programmed to control the variable power supplied by the power supply 82 to each segment 80 of the smart glass 76. The smart glass 76 is coated with a transparent conductive layer (e.g., indium tin oxide, Poly(3,4-ethylenedioxythiophene) polystyrene sulfonate (PEDOT:PSS), nanowire mesh, carbon nanotubes, graphene). The transparent conductive layer is segmented via lithography. Each segment 80 is connected to the electronics on the border of the windshield 39 via a control line, which was created through lithography on the transparent conductive layer. The width of the control line less than the width of the segment 80. The control line may be either active matrix (with thin film transistor) or passive matrix design.

With reference to FIGS. 1 and 8, the system 98 includes a display, such as an augmented reality HUD display, and a transparent windshield 39 with a smart glass 76 having electrically-tunable transmittance capabilities. When vehicle lights 84, such as headlights and/or taillights, of one or more remote vehicles 48 are identified within the road scene, appropriate locations of the windshield 39 are dimmed to shade the driver's eyes 66 from excessive glare. The display 29 simultaneously highlights the remote vehicle 48 to maintain the driver's awareness of the remote vehicle presence and real-time location. Specifically, the display 29 may present a virtual image 50 to identify each and every oncoming remote vehicle 48. As a non-limiting example, the virtual image 50 may be a bounding box (e.g., rectangle) surrounding each remote vehicle 48 near the host vehicle 10 or another graphic indicator suitable to indicate the presence and location of the oncoming remote vehicles 48. Simultaneously, the controller 34 commands the display 29 to dim the segments 80 of the windshield 39 that are in front of the lights 84 (e.g., headlights or taillights) to shade the driver's eyes 66 from excessive glare.

Figure 9:
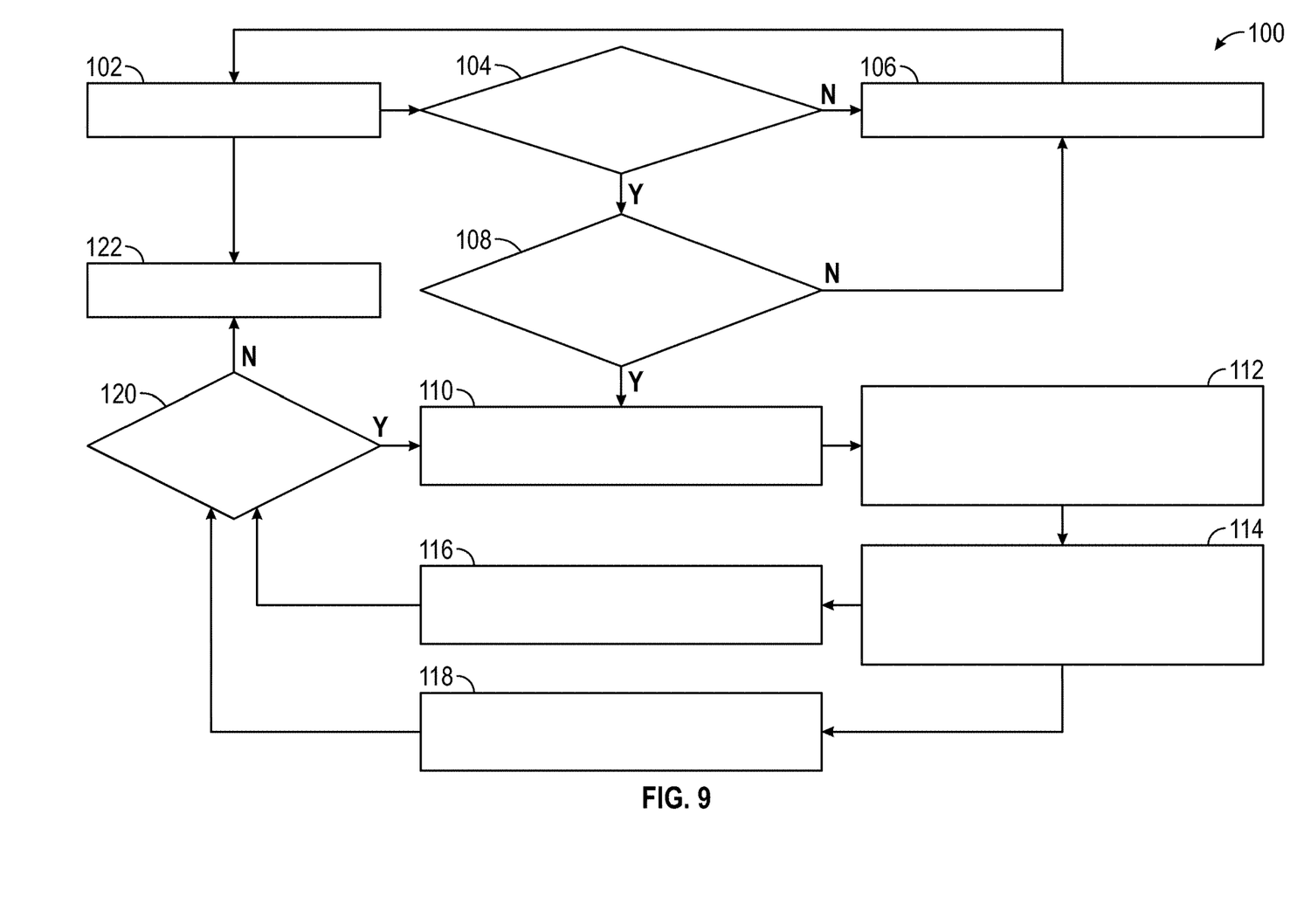
FIG. 9 is a flowchart for a method for windshield zone dimming.

FIG. 9 is a flowchart of the method 100 for windshield zone dimming. The method 100 may be executed by the controller 34 and begins at block 102, in which the controller 34 determines that the host vehicle 10 is being driven using, for example, signals generated by the sensors 40. For example, the controller 34 may receive data from one of the sensors 40, such as a speed sensor, to determine that the host vehicle 10 is moving. Then, the method 100 proceeds to block 104.

At block 104, the controller 34 commands one or more sensors 40, such as the camera 41, to scan the roadway 61 (FIG. 8) in front of the host vehicle 10 to thereby detect nearby traffic with the lights 84 on (e.g., oncoming traffic with the headlamps on or traffic ahead of the host vehicle 10 with the taillights on). Specifically, the sensors 40 scan the roadway 61 to detect remote vehicles 48 that are within a predetermined distance from the host vehicle 10. In response, the sensors 40 send sensor data to the controller 34. The controller 34 therefore receives the sensor data from the sensors 40 and determines whether one or more remote vehicles 48 within the predetermined distance from the host 10 and the lights 84 of these remote vehicles 48 are on. For example, the controller 34 uses the sensor data to detect remote vehicles 48 that are within the predetermined distance from the host vehicle 10 with their lights 84 on. In another example, the controller 34 may use the sensor data to detect remote vehicles 48 that are in front of the host vehicle 10. In another example, the sensors 40 may detect that the remote vehicles 38 are moving toward the host vehicle 10 and are within a predetermined distance from the host vehicle 10. On the left side of FIG. 8, the sensors 40 identify the remote vehicles 48 because these remote vehicles 48 are within the predetermined distance from the host vehicle, whereas the remote vehicles 48 on the right side of FIG. 8 may not be identified because these remote vehicles 48 are not within the predetermined distance of the host vehicle 10. It is also envisioned that the sensors 40 may only identifies remote vehicles 48 with the headlights on, but not remote vehicles 48 with the taillights on. If the controller 34, using the sensors 40, does not detect remote vehicles 48 that are within the predetermined distance from the host vehicle 10 with their lights 84 on, then the method 100 proceeds to block 106.

At block 106, the controller 34 does not execute an action. Therefore, the display 29 refrains from generating the virtual image 50 that identify and highlight the remote vehicles 48 that are within the predetermined distance from the host vehicle 10 with their lights 84 on. After block 106, the method 100 returns to block 102. If the controller 34, using the sensors 40, detects the remote vehicles 48 that are within the predetermined distance from the host vehicle 10 with its lights 84 on, then the method 100 proceeds to block 108.

At block 108, the controller 34 determines whether the luminous intensity of the light beam(s) emitted by the light(s) 84 of the remote vehicles 48 that is within the predetermined distance from the host vehicle 10 is greater than a predetermined threshold. This predetermined threshold may be determined via testing, and the predetermined threshold is considered the luminous intensity of the light beam that causes excessive glare, thereby preventing the vehicle operator from clearly seeing the roadway 61 in front of the host vehicle 10. If the luminous intensity of one or more of the light beams emitted by the light(s) 84 of the remote vehicles 48 that is within the predetermined distance from the host vehicle 10 is equal to or less than the predetermined threshold, then the method 100 proceeds to block 106. If the luminous intensity of one or more of the light beams emitted by the light(s) 84 of the remote vehicles 48 that is within the predetermined distance from the host vehicle 10 is greater than the predetermined threshold, then the method 100 proceeds to block 110.

At block 110, the controller 34 determines, in real time, the location of the eyes 66 and/or the head 69 of the user of the host vehicle 10 using at least one input from the user tracker 43. As discussed above, the user tracker 43 may be a camera 41 configured to track the movements of the head 69 and/or the eyes 66 of the vehicle user. The controller 34 then uses the inputs from the user tracker 43 to continuously determine, in real time, the location of the eyes 66 and/or the head 69 of the user of the host vehicle 10. Also, at block 110, the controller 34 determines, in real time, the location of the remote vehicles 48, which have the lights 84 on and are that is within the predetermined distance from the host vehicle 10, using the sensor data from the sensors 40 (e.g., GNSS transceivers). The method 100 then proceeds to block 112.

At block 112, the controller 34 determines, in real time, the location of the virtual image 50 to be displayed on the display 29 (e.g., the multi-focal plane AR HUD display or hybrid AR HUD system 49) based on the location of the eyes 66 and/or the head 69 of the vehicle user 11 of the host vehicle 10 and/or the location of the host vehicle 10 relative to the location of the remote vehicle 48 that is within the predetermined distance from the host vehicle 10 with its lights 84 on. The location of the virtual image 50 in the display 29 may change as the vehicle user 11 moves the head 69 and/or eyes 66. As a non-limiting example, the virtual image 50 may be a bounding box surrounding the entire remote vehicle 48 that has its lights 84 on and that is within the predetermined distance from the host vehicle 10. Further, the size of the virtual images 50 may increase as the remote vehicle 48 gets closer to the host vehicle 10. Next, the method 100 proceeds to block 114.

At block 114, the controller 34 determines which segments 80 of the smart glass 76 have to be dimmed to cover the light beam(s) emitted from the lights 84 of the remote vehicles 48 that is within the predetermined distance from the host vehicle 10 relative to the location of the eyes 66 and/or the head 69 of the vehicle user 11 of the host vehicle 10. To do so, the controller 34 may use the location of each segment 80 of the smart glass 76 and the previously determined location of the eyes 66 and/or the head 69 of the vehicle user 11 of the host vehicle 10. Then, the method 100 continues to block 116.

At block 116, the controller commands the display 29 (e.g., an AR HUD or full windshield display) to generate the virtual images 50 (e.g., bounding box) on the windshield 39. As a non-limiting example, the virtual images 50 may include one or more bounding boxes (i.e., rectangle) each surrounding one of the remote vehicles 48 that have the lights 84 on and are that is within the predetermined distance from the host vehicle 10. The controller 34 commands the display 29 to present the virtual image 50 on the windshield 39 at the location previously determined at block 112 in order to identify and highlight the remote vehicles 48 that are front of the host vehicle 10 and have the lights 84 on. Simultaneously, the method 100 executes to block 118.

At block 118, the controller 34 commands the smart glass 76 to dim the segments 80 determined at block 114. To do so, the controller 34 may command power supply 82 to adjust its voltage to dim the segments 80 of the smart glass 76 determined in block 114. As a result, the segments 80 identified in block 114 are dimmed to cover the light beam(s) emitted from the lights 84 of the remote vehicles 48 that is within the predetermined distance from the host vehicle 10 relative to the location of the eyes 66 and/or the head 69 of the vehicle user 11 of the host vehicle 10 as determined in block 114. At block 118, the segments 80 of the smart glass 76 identified at block 114 may be transitioned from the transparent state to the opaque state. After simultaneously executing block 116 and block 118, the method 100 continues to block 120.

At block 120, the controller 34 determines whether the remote vehicle(s) 48 identified at block 104 are still in front of the host vehicle 10 using the sensor data from the sensors 40 (e.g., camera 41). Alternatively, or additionally, the controller 34 may use the sensor data from the sensors 40 to determine whether the lights 84 of the remote vehicles 48 identified at block 104 are still on and directed toward the host vehicle 10. If the remote vehicle(s) 48 identified at block 104 are still in front of the host vehicle 10 and/or the lights 84 of the remote vehicles 48 identified at block 104 are still on and directed toward the host vehicle 10, then the method 100 returns to block 110. However, if the remote vehicle(s) 48 identified at block 104 are not in front of the host vehicle 10 and/or the lights 84 of the remote vehicles 48 identified at block 104 are off or are directed away from the host vehicle 10, then the method 100 proceed to block 122.

At block 122, the controller 34 commands the display 29 to stop generating the virtual image 50 that identify and highlight the remote vehicles 48 that are within the predetermined distance from the host vehicle 10 with their lights 84 on. Also, at block 122, the controller 34 commands the smart glass 76 to transition the segments 80 identified at block 114 to transition from the opaque state to the transparent state.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the presently disclosed system and method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

The drawings are in simplified form and are not to precise scale. For purposes of convenience and clarity only, directional terms such as top, bottom, left, right, up, over, above, below, beneath, rear, and front, may be used with respect to the drawings. These and similar directional terms are not to be construed to limit the scope of the disclosure in any manner.

Embodiments of the present disclosure are described herein. It is to be understood, however, that the disclosed embodiments are merely examples and other embodiments can take various and alternative forms. The figures are not necessarily to scale; some features could be exaggerated or minimized to display details of particular components. Therefore, specific structural and functional details disclosed herein are not to be interpreted as limiting, but merely as a representative basis for teaching one skilled in the art to variously employ the presently disclosed system and method. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

This description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A method for dimming a windshield of a host vehicle, comprising:
    detecting at least one remote vehicle that is within a predetermined distance from the host vehicle;
    detecting that a light of the at least one remote vehicle is on;
    in response to detecting the at least one remote vehicle that is within the predetermined distance from the host vehicle and detecting that the light of the at least one remote vehicle is on, determining a luminous intensity of a light beam emitted by the light of the at least one remote vehicle that is within the predetermined distance from the host vehicle;
    in response to determining the luminous intensity of the light of the at least one remote vehicle that is within the predetermined distance from the host vehicle, comparing the luminous intensity of the light beam emitted by the light of the at least one remote vehicle to a predetermined threshold to determine whether the luminous intensity of the light beam emitted by the light is greater than the predetermined threshold; and
    in response to determining that the luminous intensity of the light beam emitted by the light is greater than the predetermined threshold, dimming at least a portion of the windshield of the host vehicle to minimize a glare caused by the light beam emitted by the light of the at least one remote vehicle that is within the predetermined distance from the host vehicle.

2. The method of claim 1, further comprising determining a location of eyes of a vehicle operator of the host vehicle.

3. The method of claim 2, further comprising determining a location of the at least one remote vehicle that is within the predetermined distance from the host vehicle.

4. The method of claim 3, further comprising generating a virtual image that identifies the at least one remote vehicle.

5. The method of claim 4, further comprising determining, in real time, the location of the virtual image using the location of the eyes of the vehicle operator and the location of the at least one remote vehicle that is within the predetermined distance from the host vehicle.

6. The method of claim 5, wherein the virtual image includes a bounding box surrounding the at least one remote vehicle that is within the predetermined distance from the host vehicle.

7. The method of claim 6, wherein the windshield includes a smart glass, the smart glass includes a plurality of segments, each of the plurality of segments is configured to transition between an opaque state and a transparent state, the method further comprising determining which of the segments of the smart glass have to be dimmed to cover the light beam of the light of the at least one remote vehicle relative to the location of the eyes of the vehicle operator.

8. The method of claim 7, wherein dimming the at least the portion of the windshield of the host vehicle to minimize the glare caused by the light beam emitted by the light of the at least one remote vehicle includes dimming the segments of the smart glass that have to be dimmed to cover the light beam of the light of the at least one remote vehicle relative to the location of the eyes of the vehicle operator.

9. The method of claim 8, further comprising determining whether the light of the at least one remote vehicle is still on.

10. The method of claim 9, further comprising stopping dimming at least the portion of the windshield in response to determining that the light of the at least one remote vehicle is not on.

11. A host vehicle, comprising:
    a windshield including a smart glass;
    a display configured to project a virtual image on the windshield;
    a plurality of sensors;
    a controller in communication with the plurality of sensors, the smart glass of the windshield, and the display, wherein the controller is programmed to:
        detect at least one remote vehicle that is within a predetermined distance from the host vehicle;
        detect, using sensor data from at least one of the plurality of sensors, that a light of the at least one remote vehicle is on;
        in response to detecting the at least one remote vehicle that is within the predetermined distance from the host vehicle and detecting that the light of the at least one remote vehicle is on, determine a luminous intensity of a light beam emitted by the light of the at least one remote vehicle that is within the predetermined distance from the host vehicle;
        in response to determining the luminous intensity of the light of the at least one remote vehicle that is within the predetermined distance from the host vehicle, compare the luminous intensity of the light beam emitted by the light of the at least one remote vehicle to a predetermined threshold to determine whether the luminous intensity of the light beam emitted by the light is greater than the predetermined threshold; and
        in response to determining that the luminous intensity of the light beam emitted by the light is greater than the predetermined threshold, command the smart glass to dim at least a portion of the windshield of the host vehicle to minimize a glare caused by the light beam emitted by light of the at least one remote vehicle that is within the predetermined distance from the host vehicle.

12. The host vehicle of claim 11, further comprising an eye tracker in communication with the controller, and the controller is programmed to determine a location of eyes of a vehicle operator of the host vehicle using an input from the eye tracker.

13. The host vehicle of claim 12, wherein the controller is programmed to determine a location of the at least one remote vehicle that is within the predetermined distance from the host vehicle using the sensor data from the at least one of the plurality of sensors.

14. The host vehicle of claim 13, wherein the virtual image generated by the display identifies the at least one remote vehicle.

15. The host vehicle of claim 14, wherein the controller is programmed to determine, in real time, the location of the virtual image using the location of the eyes of the vehicle operator and the location of the at least one remote vehicle that is within the predetermined distance from the host vehicle.

16. The host vehicle of claim 15, wherein the virtual image includes a bounding box surrounding the at least one remote vehicle that is within the predetermined distance from the host vehicle.

17. The host vehicle of claim 16, wherein the smart glass includes a plurality of segments, each of the plurality of segments is configured to transition between an opaque state and a transparent state, wherein the controller is programmed to determine which of the segments of the smart glass have to be dimmed to cover the light beam of the light of the at least one remote vehicle relative to the location of the eyes of the vehicle operator.

18. The host vehicle of claim 17, wherein the controller is programmed to command the smart glass to dim the segments of the smart glass that have to be dimmed to cover the light beam of the light of the at least one remote vehicle relative to the location of the eyes of the vehicle operator.

19. The host vehicle of claim 18, wherein the controller is programmed to determine whether the light of the at least one remote vehicle is still on.

20. The host vehicle of claim 19, wherein the controller is programmed to command the smart glass to stop dimming at least the portion of the windshield in response to determining that the light of the at least one remote vehicle is not on.

\* \* \* \* \*